US012640286B2

(12) United States Patent
Hopkinson et al.

(10) Patent No.: US 12,640,286 B2
(45) Date of Patent: May 26, 2026

(54) METHOD OF FORMING CABLE BY OPENING SLIT-TAPE ISOLATOR AND INSERTING TWISTED PAIRS

(71) Applicant: CommScope Technologies LLC, Hickory, NC (US)

(72) Inventors: Wayne C. Hopkinson, Hickory, NC (US); Trent M. Hayes, Hickory, NC (US); Ted Q. Cobb, Jr., Hickory, NC (US); Douglas R. Brake, Denver, NC (US); David A. Wiebelhaus, Hickory, NC (US); Thomas M. Faison, High Point, NC (US)

(73) Assignee: CommScope Technologies LLC, Hickory, NC (US)

( * ) Notice: Subject to any disclaimer, the term of this patent is extended or adjusted under 35 U.S.C. 154(b) by 876 days.

(21) Appl. No.: 17/882,579

(22) Filed: Aug. 7, 2022

(65) Prior Publication Data

US 2022/0371252 A1     Nov. 24, 2022

Related U.S. Application Data

(63) Continuation of application No. 17/163,391, filed on Jan. 30, 2021, now Pat. No. 11,410,800, which is a
(Continued)

(51) Int. Cl.
*H01B 13/02*     (2006.01)
*B29C 48/00*     (2019.01)
(Continued)

(52) U.S. Cl.
CPC ......... *H01B 13/0207* (2013.01); *H01B 11/10* (2013.01); *H01B 13/14* (2013.01);
(Continued)

(58) Field of Classification Search
CPC .... H01B 13/0207; H01B 13/14; H01B 13/26; H01B 11/10; H01B 17/56; B29C 48/0022;
(Continued)

(56)     References Cited

U.S. PATENT DOCUMENTS

| | | |
|---|---|---|
| 2,538,019 A | 1/1951 | Lee |
| 4,110,497 A | 8/1978 | Hoel |

(Continued)

FOREIGN PATENT DOCUMENTS

| | | |
|---|---|---|
| CN | 101034604 A | 9/2007 |
| CN | 101057301 A | 10/2007 |

(Continued)

OTHER PUBLICATIONS

Celentano et al., "Design of an Industrially Feasible Twisted-Stack HTS Cable-in-Conduit Conductor for Fusion Application," in IEEE Transactions on Applied Superconductivity, vol. 24, No. 3, pp. 1-5, Jun. 2014. (Year: 2014).*

(Continued)

*Primary Examiner* — A. Dexter Tugbang
(74) *Attorney, Agent, or Firm* — Muncy, Geissler, Olds & Lowe, P.C.

(57)     ABSTRACT

A dielectric isolator for a twisted pair cable includes a body formed as an elongate strip with a top surface, bottom surface, a first side edge and a second side edge. A first slot is formed in the first side edge and extends at least half way toward the center of the isolator. A second slot is formed in the second side edge and extends at least half way toward the center of the isolator. During cable manufacturing, first and second wedges open the first and second slots. First and second twisted pairs are inserted into the first and second opened slots, respectively. Third and fourth twisted pairs reside at the top and bottom surface, respectively. The
(Continued)

isolator has the cost and reel storage savings of a flat separator tape, while simultaneously providing the internal crosstalk performance of the isolator.

20 Claims, 10 Drawing Sheets

Related U.S. Application Data continuation-in-part of application No. 17/156,571, filed on Jan. 23, 2021, now Pat. No. 11,587,700, and a continuation-in-part of application No. PCT/US2020/025774, filed on Mar. 30, 2020, said application No. 17/156,571 is a continuation of application No. PCT/US2019/040022, filed on Jun. 29, 2019.

(60) Provisional application No. 62/830,975, filed on Apr. 8, 2019, provisional application No. 62/712,939, filed on Jul. 31, 2018.

(51) Int. Cl.

| | |
|---|---|
| *H01B 11/10* | (2006.01) |
| *H01B 13/14* | (2006.01) |
| *H01B 13/26* | (2006.01) |
| *H01B 17/56* | (2006.01) |
| *B29C 48/06* | (2019.01) |
| *B29C 48/154* | (2019.01) |
| *B29L 11/00* | (2006.01) |

(52) U.S. Cl.
CPC ............. *H01B 13/26* (2013.01); *H01B 17/56* (2013.01); *B29C 48/0022* (2019.02); *B29C 48/06* (2019.02); *B29C 48/154* (2019.02); *B29K 2995/0005* (2013.01); *B29K 2995/0006* (2013.01); *B29K 2995/0007* (2013.01); *B29L 2011/0075* (2013.01)

(58) Field of Classification Search
CPC .................. B29C 48/06; B29C 48/156; B29K 2995/0005; B29K 2995/0006; B29K 2995/0007; B29L 2011/0075
See application file for complete search history.

(56) References Cited

U.S. PATENT DOCUMENTS

| | | | |
|---|---|---|---|
| 5,087,110 | A | 2/1992 | Inagaki et al. |
| 5,286,924 | A | 2/1994 | Loder et al. |
| 5,699,467 | A | 12/1997 | Kojima et al. |
| 6,222,130 | B1 | 4/2001 | Gareis et al. |
| 6,310,295 | B1 | 10/2001 | Despard |
| 6,329,040 | B1 | 12/2001 | Oshima et al. |
| 6,506,976 | B1 | 1/2003 | Neveux, Jr. |
| 6,800,811 | B1 | 10/2004 | Boucino |
| 6,974,913 | B2 | 12/2005 | Bahlmann et al. |
| 7,179,999 | B2 | 2/2007 | Clark et al. |
| 7,244,893 | B2 | 7/2007 | Clark |
| 7,335,837 | B2 | 2/2008 | Pfeiler et al. |
| 7,405,360 | B2 | 7/2008 | Clark et al. |
| 7,507,910 | B2 | 3/2009 | Park et al. |
| 7,705,244 | B2 | 4/2010 | Fok |
| 7,772,494 | B2 | 8/2010 | Vexler et al. |
| 7,838,773 | B2 | 11/2010 | Vexler et al. |
| 7,999,184 | B2 | 8/2011 | Wiebelhaus et al. |
| 8,030,571 | B2 | 10/2011 | Vexler et al. |
| 8,455,762 | B2 | 6/2013 | Vexler et al. |
| 8,798,419 | B2 | 8/2014 | Wessels, Jr. et al. |
| 9,076,568 | B2 | 7/2015 | Wessels, Jr. et al. |
| 9,275,776 | B1 | 3/2016 | McNut |
| 9,316,801 | B1 | 4/2016 | Kithuka |
| 9,363,935 | B1 * | 6/2016 | Cook ..................... H01B 13/26 |
| 9,418,775 | B2 | 8/2016 | Wessels, Jr. et al. |
| 9,928,943 | B1 | 3/2018 | McNutt et al. |
| 10,068,685 | B1 | 9/2018 | Cook |
| 10,121,571 | B1 | 11/2018 | McNutt et al. |
| 2003/0111241 | A1 | 6/2003 | Bahlmann et al. |
| 2003/0150638 | A1 | 8/2003 | Mahesh |
| 2005/0092515 | A1 | 5/2005 | Kenny et al. |
| 2007/0044995 | A1 | 3/2007 | Park et al. |
| 2007/0193769 | A1 | 8/2007 | Clark et al. |
| 2009/0289212 | A1 | 11/2009 | Schroeer |
| 2011/0174531 | A1 | 7/2011 | Rubera et al. |
| 2013/0014972 | A1 | 1/2013 | Wessels, Jr. et al. |
| 2013/0161063 | A1 | 6/2013 | Gould et al. |
| 2014/0251652 | A1 | 9/2014 | Poulsen et al. |
| 2014/0262427 | A1 | 9/2014 | Brown et al. |
| 2015/0129277 | A1 | 5/2015 | Srinivas et al. |
| 2017/0154710 | A1 | 6/2017 | Cobb, Jr. et al. |
| 2018/0301245 | A1 | 10/2018 | Glew |
| 2018/0374609 | A1 | 12/2018 | Wachtel et al. |

FOREIGN PATENT DOCUMENTS

| | | | | |
|---|---|---|---|---|
| CN | 101253581 | A | 8/2008 | |
| EP | 1 833 061 | A2 | 9/2007 | |
| EP | 3 462 464 | A1 | 4/2019 | |
| GB | 2187460 | A | 9/1987 | |
| JP | 2007258169 | A | * 10/2007 | ............. H01B 11/06 |
| JP | 2018 152282 | A | 9/2018 | |
| WO | WO 2006/050612 | A1 | 5/2006 | |

OTHER PUBLICATIONS

Search and Examination Report from Indian Patent Office, Apr. 30, 2024.
Search and Examination Report from the European Patent Office, Mar. 13, 2023.
Search and Examination Report from the European Patent Office, Jul. 19, 2024.

* cited by examiner

METHOD OF FORMING CABLE BY OPENING SLIT-TAPE ISOLATOR AND INSERTING TWISTED PAIRS

This application is a continuation of U.S. application Ser. No. 17/163,391, filed Jan. 30, 2021, which is a continuation-in-part of International Application No. PCT/US2020/025774, filed Mar. 30, 2020, which claims the benefit of U.S. Provisional Application No. 62/830,975, filed Apr. 8, 2019, all of which are herein incorporated by reference. U.S. application Ser. No. 17/163,391, filed Jan. 30, 2021, is also a continuation-in-part of U.S. Utility application Ser. No. 17/156,571, filed Jan. 23, 2021, which is a continuation of International Application No. PCT/US2019/040022, filed Jun. 29, 2019, which claims the benefit of U.S. Provisional Application No. 62/712,939, filed Jul. 31, 2018, all of which are herein incorporated by reference.

BACKGROUND OF THE INVENTION

1. Field of the Invention

The present invention relates to a twisted pair cable for communication of high speed signals, such as a local area network (LAN) cable. More particularly, the present invention relates to a twisted pair cable having an isolator between twisted pairs within the cable, which isolator separates each of the twisted pairs from the other twisted pairs of the cable, and wherein the isolator is initially formed as a relatively flat member, e.g., a tape with slits in its thickness.

2. Description of the Related Art

Along with the greatly increased use of computers for homes and offices, there has developed a need for a cable, which may be used to connect peripheral equipment to computers and to connect plural computers and peripheral equipment into a common network. Today's computers and peripherals operate at ever increasing data transmission rates. Therefore, there is a continuing need to develop a cable, which can operate substantially error-free at higher bit rates, by satisfying numerous elevated operational performance criteria, such as a reduction in internal and alien crosstalk when the cable is in a high cable density application. e.g. routed alongside other cables.

FIGS. 1 and 2 show a typical shielded twisted pair cable 1 and a twisting scheme employed for the four twisted pairs of wires (a first twisted pair A, a second twisted pair B, a third twisted pair C and a fourth twisted pair D). A dielectric isolator 3 separates twisted pair A from twisted pairs B, C and D, separates twisted pair B from twisted pairs C and D, and also separates twisted pair C from twisted pair D. The isolator 3 may also be referred to as a flute, star-shaped separator or plus-shaped separator.

The twisted pairs A, B, C and D in combination with the isolator 3 may be twisted in the direction of arrow 5 (e.g., opposite to the twist direction of the twisted pairs A, B, C and D) to form a stranded core. The stranded core is surrounded by a shielding layer 7. The shielding layer 7 may be formed of a conductive foil, and the foil's edges may partially overlap at area 9. A dielectric outer jacket 11 then surrounds the shielding layer 7.

Each twisted pair A, B, C and D includes two insulated conductors. Specifically, the first twisted pair A includes a first insulated conductor 13 and a second insulated conductor 15. The second twisted pair B includes a third insulated conductor 17 and a fourth insulated conductor 19. The third twisted pair C includes a fifth insulated conductor 21 and a sixth insulated conductor 23. The fourth twisted pair D includes a seventh insulated conductor 25 and an eighth insulated conductor 27.

Each twisted pair A, B, C and D is formed by having its two insulated conductors continuously twisted around each other. For the first twisted pair A, the first conductor 13 and the second conductor 15 twist completely about each other, three hundred sixty degrees (a), at a first interval w along the length of the cable 1. For the second twisted pair B, the third conductor 17 and the fourth conductor 19 twist completely about each other, three hundred sixty degrees (b), at a second interval x along the length of the cable 1. For the third twisted pair C, the fifth conductor 21 and the sixth conductor 23 twist completely about each other, three hundred sixty degrees (c), at a third interval y along the length of the cable 1. For the fourth twisted pair D, the seventh conductor 25 and the eighth conductor 27 twist completely about each other, three hundred sixty degrees (d), at a fourth interval z along the length of the cable 1.

Each of the twisted pairs A, B, C and D has a fixed twist interval w, x, y, z, respectively. Each of the twist intervals w, x, y, z is different from the twist interval of the other twisted pairs. As is known in the art, such an arrangement assists in reducing crosstalk between the twisted pairs within the cable 1, which is referred to as internal crosstalk. In one embodiment of the prior art, each of the twisted pairs A, B, C and D has a unique fixed twist interval of slightly more than, or less than, 0.500 inches. Table 1 below summarizes the twist interval ranges for the twisted pairs A, B, C and D.

TABLE 1

| Twisted Pair | Twist Length | Min. Twist Length | Max Twist Length |
|---|---|---|---|
| A | 0.440 | 0.430 | 0.450 |
| B | 0.410 | 0.400 | 0.420 |
| C | 0.596 | 0.580 | 0.610 |
| D | 0.670 | 0.650 | 0.690 |

SUMMARY OF THE INVENTION

The Applicant has appreciated that the isolator 3 is a rather costly element of the cable core. Also, the isolator 3 is an extruded element with four projecting fins, and does not wind well on a reel, e.g., lots of air gaps exist in the wound up isolator 3. Therefore, a shorter length of isolator 3 can wound onto a reel of a given size.

An extruded flat separator tape is relatively cheaper than a plus-shaped isolator 3. Also, the extruded flat separator tape winds up nicely on a reel with much less air gaps. Therefore, a significantly longer flat separator tape can exist on reel of the same given size.

However, there are significant drawbacks for a flat separator tape. A flat separator tape only separates two of the twisted pairs from the other two twisted pairs, e.g., twisted pairs A and C from twisted pairs B and D. Therefore, the flat separator tape is inferior in reducing internal crosstalk, as compared to the isolator 3 of FIGS. 1 and 2.

The Applicant has invented a new isolator which may be extruded as a flat tape with slits formed in its thickness. Alternatively, the new isolator may be extruded as a flat tape and slits may be formed in the thickness of the tape by a cutting operation. In a preferred embodiment, two slits are formed into the thickness of the new separator, one on each lateral side of the new isolator. The new isolator may be wound on a reel in the same manner as a conventional flat separator tape. Hence, the new isolator does not include lots of air within the windings on the reel, and a longer new isolator may be wound on the reel of the same given size, as compared to the old isolator 3 of FIGS. 1-2.

As a cable is being manufacturing the new isolator is fed from the reel to a cable assembly area. Within the cable assembly area, wedges open the slits. A first twisted pair is inserted into a first of the opened wedges, a second twisted pair is inserted into a second of the open slits, a third twisted pair is placed on top of the new isolator, and a fourth twisted pair is place beneath the new isolator. Next, an optional shielding layer or core wrap encircles the cable core, and finally an outer jacket is extruded over the cable core.

The present invention provides the cost savings and storage savings of a flat separator tape, while simultaneously providing the internal crosstalk performance of the isolator 3.

These and other objects are accomplished by an isolator for a twisted pair cable comprising: a body formed as an elongate strip with a top surface and a bottom surface, with a distance between said top and bottom surfaces defining a thickness of said isolator; a first side edge and a second side edge formed on said body, with a distance between said first and second side edges defining a width of said isolator; a first slot formed in said first side edge and extending into said body in a direction of said width of said isolator; and a second slot formed in said second side edge and extending into said body in a direction of said width of said isolator.

Moreover, these and other objects are accomplished by a method of forming a twisted pair cable comprising: providing an isolator including: a body formed as an elongate strip with a top surface and a bottom surface, with a distance between the top and bottom surfaces defining a thickness of the isolator; a first side edge and a second side edge formed on the body, with a distance between the first and second side edges defining a width of the isolator; a first slot formed in the first side edge and extending into the body in a direction of the width of the isolator; and a second slot formed in the second side edge and extending into the body in a direction of the width of the isolator; feeding first, second, third and fourth twisted pairs to a cable assembly area; feeding the isolator to the cable assembly area; inserting a first wedge into the first slot and opening the first slot as the isolator passes through the cable assembly area; inserting a second wedge into the second slot and opening the second slot as the isolator passes through the cable assembly area; placing the first twisted pair into the opened first slot of the isolator; placing the second twisted pair adjacent to the top surface of the isolator; placing the third twisted pair into the opened second slot of the isolator; placing the fourth twisted pair adjacent to the bottom surface of the isolator; and extruding an outer jacket over the isolator and the first, second, third and fourth twisted pairs.

Furthermore, these and other objects are accomplished by a cable comprising: a first conductor; a first insulating material surrounding said first conductor to form a first insulated conductor; a second conductor; and a second insulating material surrounding said second conductor to form a second insulated conductor, wherein said first and second insulated conductors are twisted about each other to form a first twisted pair; a third conductor; a third insulating material surrounding said third conductor to form a third insulated conductor; a fourth conductor; and a fourth insulating material surrounding said fourth conductor to form a fourth insulated conductor, wherein said third and fourth insulated conductors are twisted about each other to form a second twisted pair; a fifth conductor; a fifth insulating material surrounding said fifth conductor to form a fifth insulated conductor; a sixth conductor; and a sixth insulating material surrounding said sixth conductor to form a sixth insulated conductor, wherein said fifth and sixth insulated conductors are twisted about each other to form a third twisted pair; a seventh conductor; a seventh insulating material surrounding said seventh conductor to form a seventh insulated conductor; an eighth conductor; and an eighth insulating material surrounding said eighth conductor to form an eighth insulated conductor, wherein said seventh and eighth insulated conductors are twisted about each other to form a fourth twisted pair; an isolator separating said first twisted pair from said second, third and fourth twisted pairs, separating said second twisted pair from said third and fourth twisted pairs, and also separating said third twisted pair from said fourth twisted pair, wherein said isolator has a closed first notch formed on a top surface thereof and said first twisted pair abutting said top surface, and a closed second notch on a bottom surface thereof and said third twisted pair abutting said bottom surface; and a jacket surrounding said isolator, said first, second, third and fourth twisted pairs.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein.

DETAILED DESCRIPTION OF EMBODIMENTS OF THE INVENTION

Figure 1:
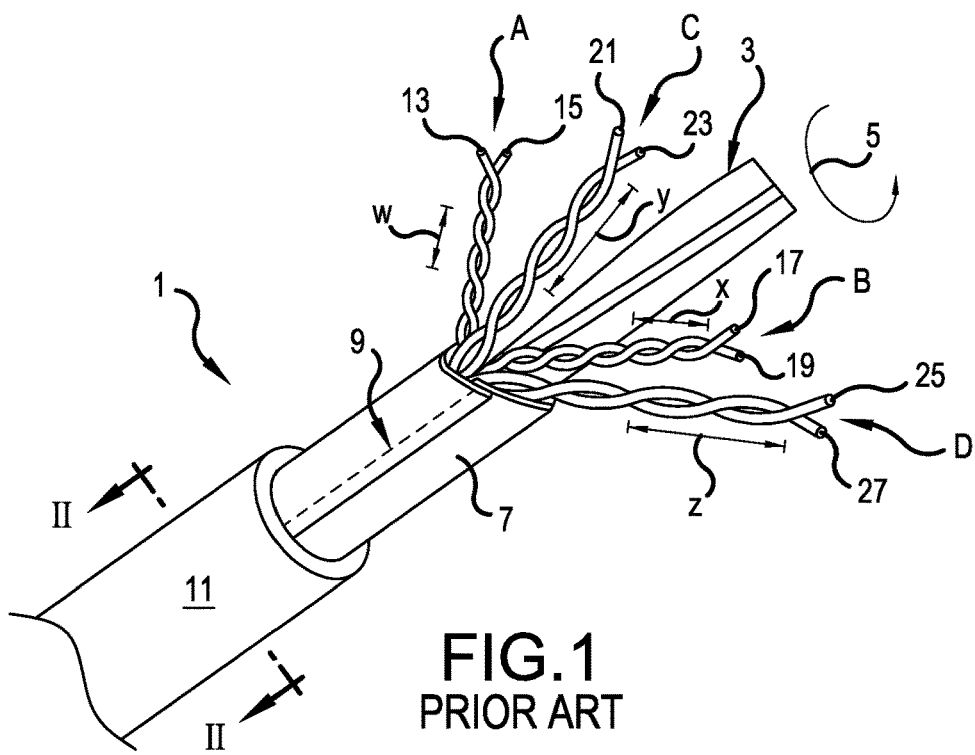
FIG. 1 is a perspective view of a shielded, twisted pair cable, in accordance with the prior art.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 3:
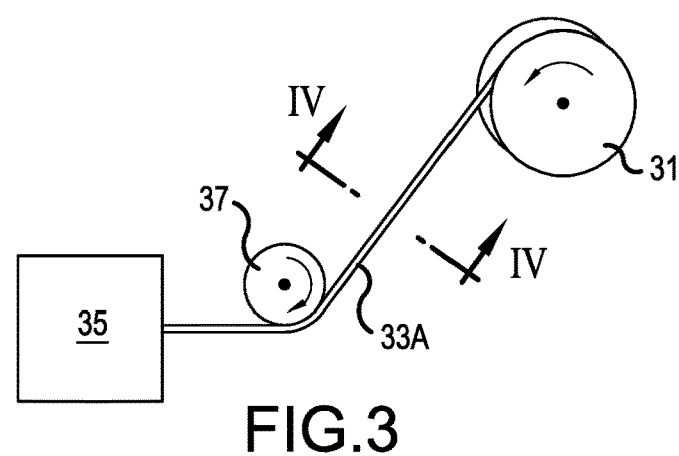
FIG. 3 is a block diagram of a reel of isolator, in accordance with a first embodiment of the present invention, being fed to a cable assembly unit.

FIG. 3 is a block diagram of a spool or reel 31 of wound isolator 33A, in accordance with a first embodiment of the present invention. The isolator 33A is being fed to a cable assembly area 35 and may pass over one or more powered or idler pulleys or rollers 37. More description regarding the cable assembly area 35 will be given in relation to FIG. 6.

Figure 4:
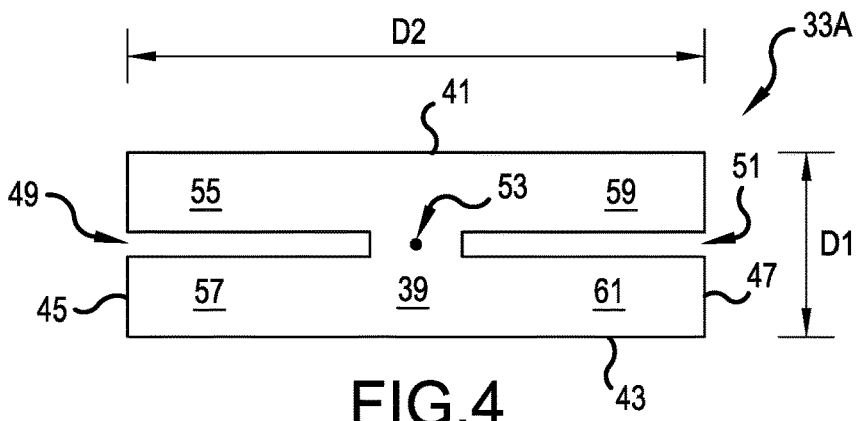
FIG. 4 is a cross sectional view of the isolator taken along line IV-IV in FIG. 3.

FIG. 4 is a cross sectional view of the isolator 33A taken along line IV-IV in FIG. 3. The isolator 33A includes a body 39 formed as an elongate strip with a top surface 41 and a bottom surface 43. A first distance D1 exists between the top surface 41 and the bottom surface 43, and defines a thickness of the body 39. A first side edge 45 and a second side edge 47 are formed on the body 39. A second distance D2 exists between the first side edge 45 and the second side edge 47 and defines a width of the body 39.

A first slot 49 is formed in the first side edge 45. The first slot 49 extends into the body 39 in a direction of the width of the body 39. More particularly, the first slot 49 extends toward a center 53 of the isolator 33A, parallel to the top and bottom surfaces 41 and 43. The center 53 extends along a central axis or longitudinal axis of the isolator 33A, which runs along the length of the isolator 33A. The first slot 49 extends into the body 39 at least halfway to the center 53 of the isolator 33A, e.g., more than 75% of the way, such as about 85% of the way to the center 53, and extends along the entire length of the isolator 33A. The first slot 49 creates first and second legs 55 and 57.

A second slot 51 is formed in the second side edge 47. The second slot 51 extends into the body 39 in a direction of the width of the body 39. More particularly, the second slot 51 extends toward the center 53 of the isolator 33A, parallel to the top and bottom surfaces 41 and 43. The second slot 51 extends into the body 39 at least halfway to the center 53 of the isolator 33A, e.g., more than 75% of the way, such as about 85% of the way to the center 53, and extends along the entire length of the isolator 33A. The second slot 51 creates third and fourth legs 59 and 61.

In a preferred embodiment, the body 39 is formed of a dielectric material. For example, the body 39 may be formed of a solid or foamed polyethylene (PE) or a solid or foamed fluorinated ethylene-propylene (FEP), where foamed implies the purposeful introduction of gas bubbles, such as air bubbles, into the material to decrease the overall dielectric constant of the isolator 33A. Of course, other materials may also be suitable for the body 39 of the isolator 33A, such as any extrudable polymer including polypropylene (PP), polyethylene terephthalate (PET), polyvinylidene fluoride (PVDF), ethylene chlorotrifluoroethylene (ECTFE), flame retardant PE, flame-retardant PP and other filled or unfilled polyolefins.

For plenum-rated cables, the isolator 3 of the prior art (FIGS. 1 and 2) is typically formed of FEP due to its superior properties relating to fire and smoke suppression. Unfortunately, FEP is an expensive material. Therefore, a preferred material composition for the body 39 of the present invention is a filled polyolefin. The fill material may include one or more fire retardants, such as ammonium octamolybdate (AOM), or microencapsulated AOM, as detailed in the present Assignee's pending application serial number PCT/US2020/031490, which is herein incorporated by reference. Other suitable fire retardant materials could include calcium carbonate, clay, metal hydroxide, mica, red phosphorus, silica, talc and zinc borate (sold under the trademark FIRE BRAKE). In one embodiment, the fill material may also include glass beads, sometimes referred to as glass microspheres. Such glass beads are hollow and include air therein, which can reduce the dielectric constant of the polyolefin material, as well as reduce the amount of polyolefin material available to burn.

In a preferred embodiment, the thickness, indicated by the distance D1, is between 9 to 18 mils, such as between 10 to 15 mils, or about 12 mils. The width, indicated by the distance D2, is between 90 to 130 mils, such as between 100 to 120 mills, or about 110 mils. The distances D1 and D2 illustrate that the thickness of the first slot 49, which is the same or similar to the thickness of the second slot 51, is too small to accept an insulated conductor, e.g., the first insulated conductor 13, and hence too small to accept a twisted pair, e.g., the first twisted pair A. The first slot 49 must be opened to be large enough to accept a twisted pair, as will be further explain herein.

Figure 5:
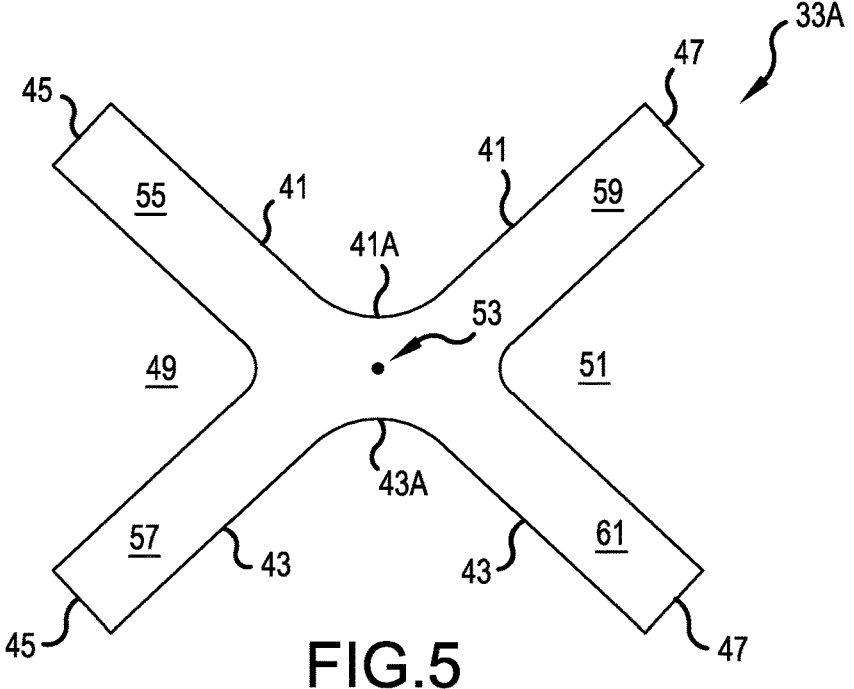
FIG. 5 is a cross sectional view of the isolator of FIG. 4 after passing through the cable assembly unit.
Figure 6:
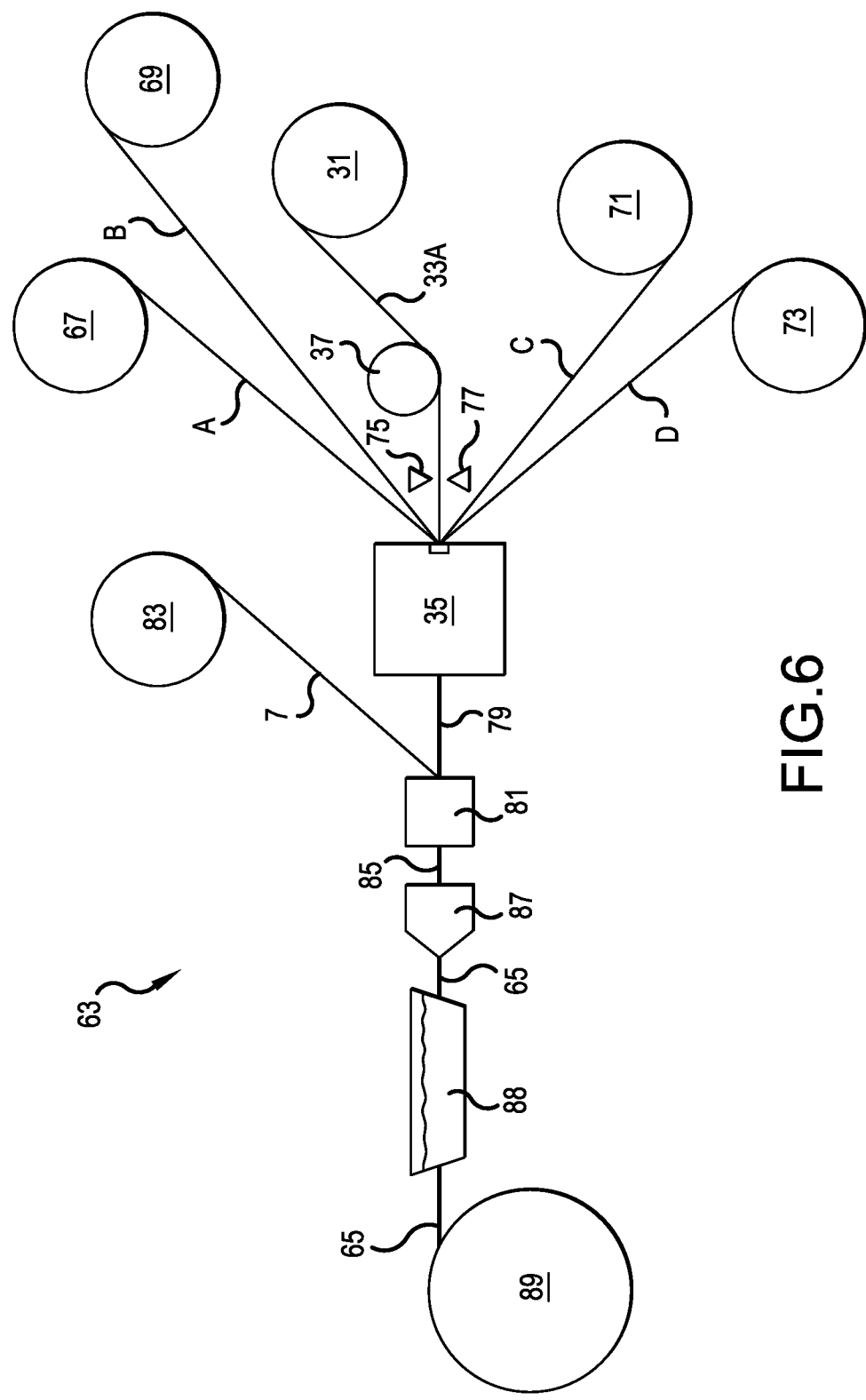
FIG. 6 is a block diagram of a machine to produce a twisted pair cable using the isolator of FIGS. 3-5.

FIG. 6 is a block diagram of a machine 63 used to produce a twisted pair cable 65 using the isolator 33A of FIGS. 3-5. In addition to the elements of FIG. 3, the machine 63 includes a first spool 67 containing the first twisted pair A, a second spool 69 containing the second twisted pair B, a third spool 71 containing the third twisted pair C, and a fourth spool 73 containing the fourth twisted pair D.

Figure 6A:
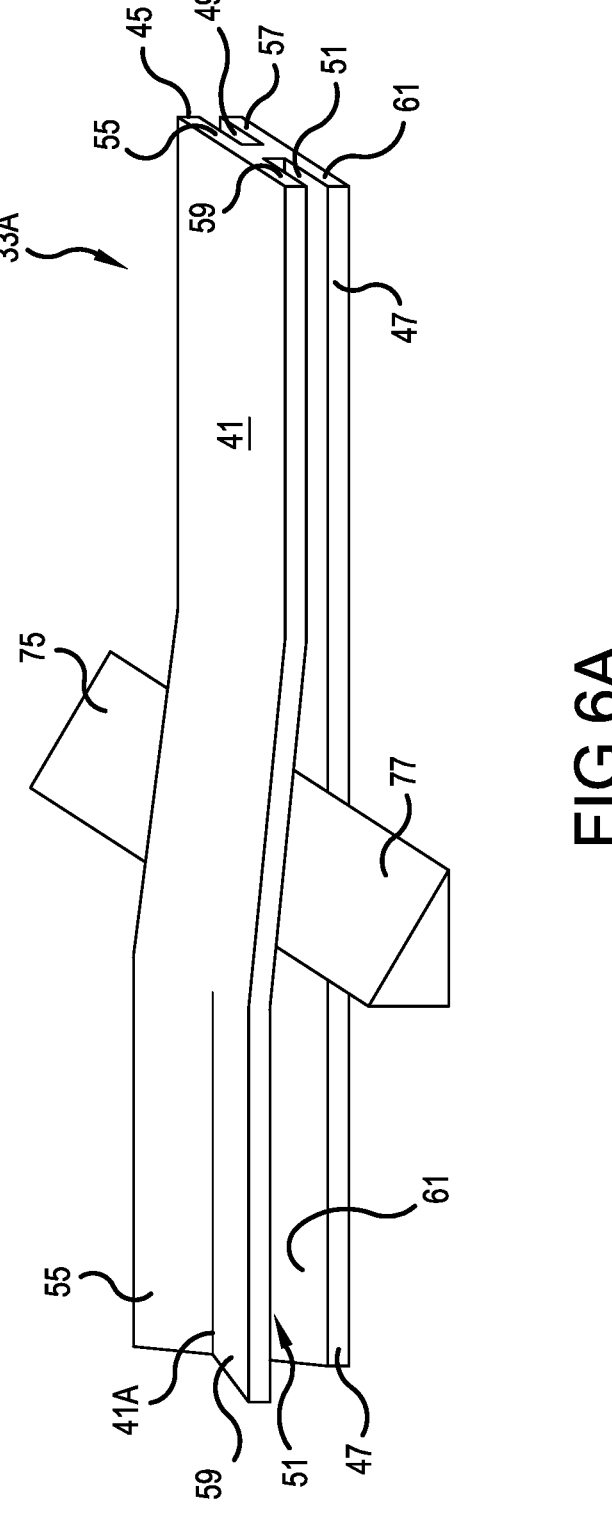
FIG. 6A is a close-up perspective view of the interaction of first and second wedges with the isolator of FIGS. 3-5.

During the formation of the twisted pair cable 65, the first, second, third and fourth twisted pairs A, B, C and D are fed to the cable assembly area 35, along with the isolator 33A. As best seen in the close-up view of FIG. 6A, as the isolator 33A enters the cable assembly area 35, a first wedge 75 is inserted into the first slot 49 and opens the first slot 49 as the isolator 33A passes through the cable assembly area 35. A separate, second wedge 77 is located adjacent to the second side edge 47 of the isolator 33A. The second wedge 77 is inserted into the second slot 51 and opens the second slot 51 as the isolator 33A passes through the cable assembly area 35.

The isolator 33A obtains the configuration shown in FIG. 5 due to the first and second wedges 75 and 77 opening the first and second slots 49 and 51. In other words, the portions of the isolator 33A to the right side (upstream) of the first and second wedges 75 and 77 in FIG. 6A have the cross section of FIG. 4, and the portions of the isolator 33A to the left side (downstream) of the first and second wedges 75 and 77 in FIG. 6A have the cross section of FIG. 5. The body 39 of the isolator 33A changes and may undergo permanent elastic deformations, such as compressions and elongations as the first and second wedges 75 and 77 open the first and second slots 49 and 51. In other words, the material forming the body 39 of the isolator 33A has a low resiliency and tends to maintain the shape deformations, as shown in FIG. 5.

Also, the material forming the body 39 of the isolator 33A may have a low compressive strength, which means that the isolator 33A can easily be deformed/crushed along its long axis to simplify the connectorization process for certain connector designs.

As best seen in FIG. 5, the angle between the first and second legs 55 and 57 is approximately ninety degrees, and the angle between the third and fourth legs 59 and 61 is approximately ninety degrees. Opening the first and second slots 49 and 51 results in a first bow 41A in the top surface 41 so that an angle between the first and third legs 55 and 59 changes from one hundred eighty degrees to approximately ninety degrees. Also, opening the first and second slots 49 and 51 results in a second bow 43A in the bottom surface 43 so that an angle between the second and fourth legs 57 and 61 changes from one hundred eighty degrees to approximately ninety degrees.

Within the cable assembly area 35, the first twisted pair A is placed into the opened first slot 49, the second twisted pair B is placed adjacent to the top surface 41 in the first bow 41A, the third twisted pair C is placed into the opened second slot 51, and the fourth twisted pair D is placed adjacent to the bottom surface 43 in the second bow 43A. Preferably, the cable assembly area 35 imposes a twist to the assembled isolator 33A and first, second, third and fourth twisted pairs A, B, C and D to form a twisted core 79.

Figure 2:
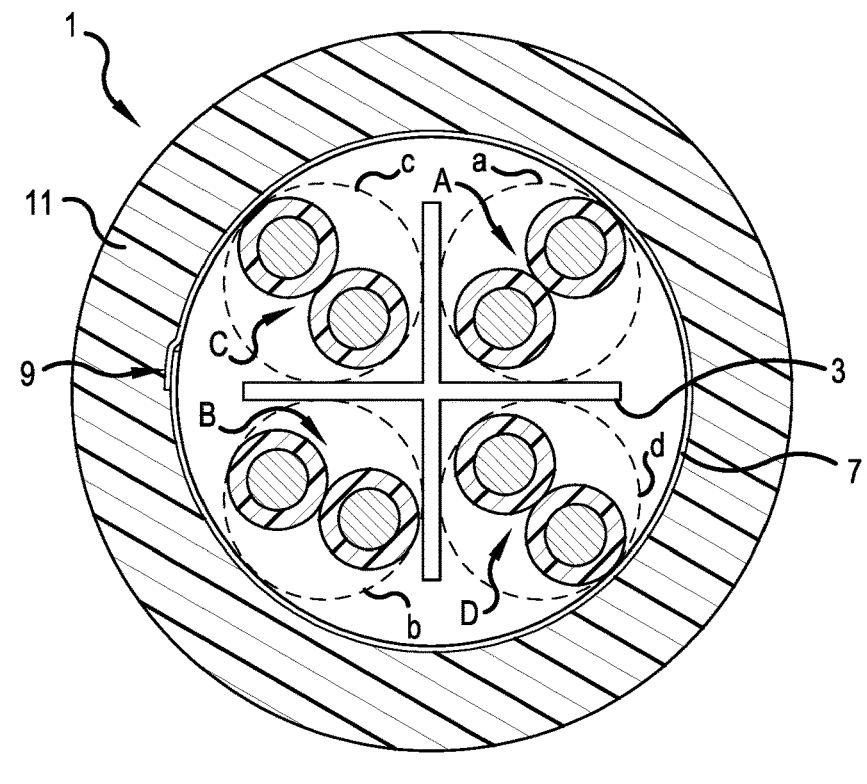
FIG. 2 is a cross sectional view taken along line II-II in FIG. 1.

The twisted core 79 may be fed to a shielding unit 81. The shielding layer 7 is fed from a spool 83 into the shielding unit 81. Within the shielding unit 81, the shielding layer 7 is wrapped around and surrounds the twisted core 79. The shielding layer 7 may also include the overlap 9, as shown in FIGS. 1-2 so as to form a shielded twisted core 85. The shielding layer 7 may be formed of a conductive layer on a nonconductive layer. One suitable material for the conductive layer is aluminum foil, although other materials may be selected. One suitable material for the nonconductive layer is a polyester film or biaxially-oriented polyethylene terephthalate, e.g., Mylar®.

The shielded twisted core 85 is fed to an extruder 87. Within the extruder 87, the outer jacket 11 is extruded over the isolator 33A, the first, second, third and fourth twisted pairs A, B, C and D, and the shielding layer 7 to form the twisted pair cable 65. The outer jacket 11 may be formed of polyvinylchloride (PVC), low smoke zero halogen, polyethylene (PE), fluorinated ethylene propylene (FEP), polyvinylidene fluoride (PVDF), ethylene chlorotrifluoroethylene (ECTFE), or other foamed or solid polyolefin materials common to the cabling art. The polyolefin materials may also include fill materials. The fill materials may include one or more fire retardants, such as ammonium octamolybdate (AOM), or microencapsulated AOM, as detailed in the Assignee's pending application serial number PCT/US2020/031490, which is herein incorporated by reference. Other suitable fire retardant materials could include calcium carbonate, clay, metal hydroxide, mica, red phosphorus, silica, talc and zinc borate (sold under the trademark FIRE BRAKE). In one embodiment, the fill materials may also include glass beads, sometimes referred to as glass microspheres. Such glass beads are hollow and include air therein, which can reduce the dielectric constant of the polyolefin material, as well as reduce the amount of polyolefin material available to burn.

The twisted pair cable 65 is typically passed through a cool water bath 88 to solidify the outer jacket 11, and then accumulated onto a spool 89. The machinery to manufacture the twisted pair cable 65 is basically known in the art except for the first and second wedges 75 and 77, which open the first and second slots 49 and 51.

Figure 7:
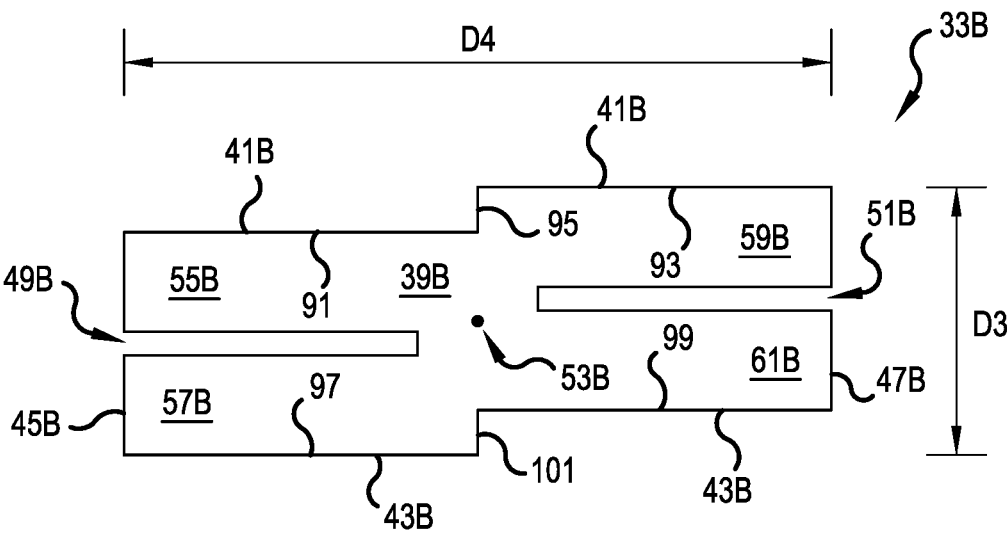
FIG. 7 is a cross sectional view of a second embodiment of an isolator similar to FIG. 3.

FIG. 7 is a cross sectional view of an isolator 33B, in accordance with a second embodiment. The isolator 33B includes a body 39B formed as an elongate strip with a top surface 41B and a bottom surface 43B. A first distance D3 exists between the top surface 41B and the bottom surface 43B, and defines a thickness of the body 39B. A first side edge 45B and a second side edge 47B are formed on the body 39B. A second distance D4 exists between the first side edge 45B and the second side edge 47B and defines a width of the body 39B.

A first slot 49B is formed in the first side edge 45B. The first slot 49B extends into the body 39B in a direction of the width of the body 39B. More particularly, the first slot 49B extends toward a center 53B of the isolator 33B, parallel to the top and bottom surfaces 41B and 43B. The first slot 49B extends into the body 39B at least halfway to the center 53B of the isolator 33B, e.g., more than 75% of the way, such as about 85% of the way to the center 53B, and extends along the entire length of the isolator 33B. The first slot 49B creates first and second legs 55B and 57B.

A second slot 51B is formed in the second side edge 47B. The second slot 51B extends into the body 39B in a direction of the width of the body 39B. More particularly, the second slot 51B extends toward the center 53B of the isolator 33B, parallel to the top and bottom surfaces 41B and 43B. The second slot 51B extends into the body 39B at least halfway to the center 53B of the isolator 33B, e.g., more than 75% of the way, such as about 85% of the way to the center 53B, and extends along the entire length of the isolator 33B. The second slot 51B creates third and fourth legs 59B and 61B.

The distances D3 and D4 may be approximately within the same ranges mentioned above for the distances D1 and D2, respectively. Also, the material used for the body 39B may be the same material used for the body 39. The primary difference between the embodiment of FIG. 7 and the embodiment of FIG. 4 is that top surface 41B is formed by first and second planar surfaces 91 and 93 and includes a first step 95 between the first and second planar surfaces 91 and 93. Further, the bottom surface 43B is formed by third and fourth planar surfaces 97 and 99 and includes a second step 101 between the third and fourth planar surfaces 97 and 99.

Figure 8:
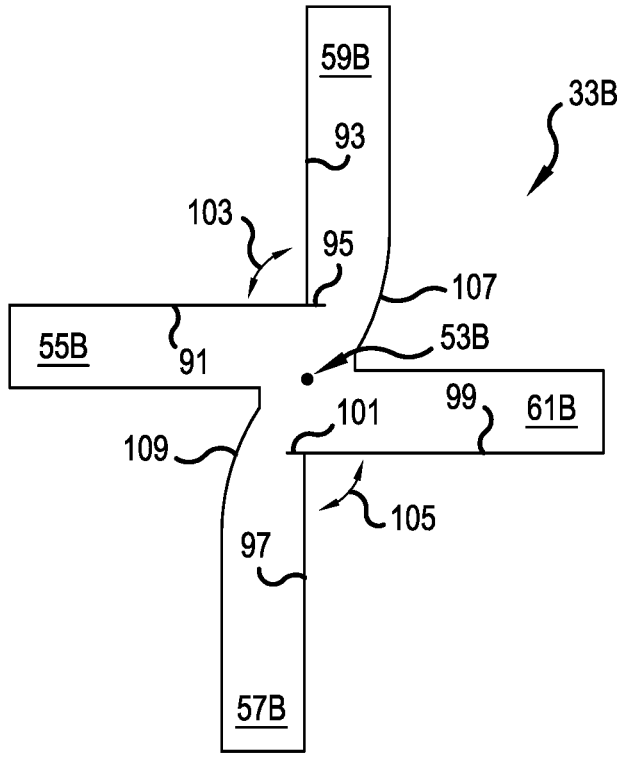
FIG. 8 is a cross sectional view of the isolator of FIG. 7 after passing through the cable assembly unit.

The first and second steps 95 and 101 provide natural bend points when the first and second slots 49B and 51B are opened by the first and second wedges 75 and 77. As such, the gradual curves of the first and second bows 41A and 43A in FIG. 5 tend to be reduced toward more angular bends, like the ninety degree angles 103 and 105 illustrated in FIG. 8, after the opening of the first and second slots 49 and 51. However, FIG. 8 still illustrates elongation deformations in the areas 107 and 109 as the isolator 33B is opened by the first and second wedges 75 and 77. The isolator 33B of FIGS. 7 and 8 may be used in conjunction with the machine 63 of FIG. 6 to form a twisted pair cable 65B.

Figures 9, 10:
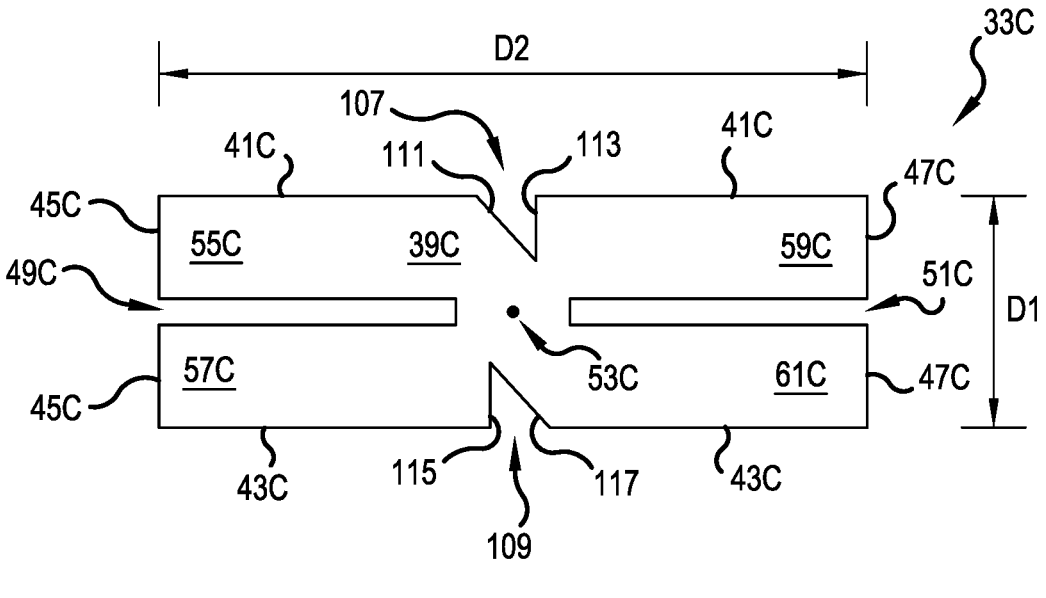
FIG. 9 is a cross sectional view of a third embodiment of an isolator similar to FIG. 3.
FIG. 10 is a cross sectional view of the isolator of FIG. 9 after passing through the cable assembly unit.

FIG. 9 is a cross sectional view of an isolator 33C, in accordance with a third embodiment. The isolator 33C includes a body 39C formed as an elongate strip with a top surface 41C and a bottom surface 43C. The first distance D1 exists between the top surface 41C and the bottom surface 43C, and defines a thickness of the body 39C. A first side edge 45C and a second side edge 47C are formed on the body 39C. The second distance D2 exists between the first side edge 45C and the second side edge 47C and defines a width of the body 39C.

A first slot 49C is formed in the first side edge 45C. The first slot 49C extends into the body 39C in a direction of the width of the body 39C. More particularly, the first slot 49C extends toward a center 53C of the isolator 33C, parallel to the top and bottom surfaces 41C and 43C. The first slot 49C extends into the body 39C at least halfway to the center 53C of the isolator 33C, e.g., more than 75% of the way, such as about 85% of the way to the center 53C, and extends along the entire length of the isolator 33C. The first slot 49C creates first and second legs 55C and 57C.

A second slot 51C is formed in the second side edge 47C. The second slot 51C extends into the body 39C in a direction of the width of the body 39C. More particularly, the second slot 51C extends toward the center 53C of the isolator 33C, parallel to the top and bottom surfaces 41C and 43C. The second slot 51C extends into the body 39C at least halfway to the center 53C of the isolator 33C, e.g., more than 75% of the way, such as about 85% of the way to the center 53C, and extends along the entire length of the isolator 33C. The second slot 51C creates third and fourth legs 59C and 61C.

The material used for the body 39C may be the same material used for the body 39. The primary difference between the embodiment of FIG. 9 and the embodiment of FIG. 4 is that top surface 41C includes a first recessed area 107, proximate a mid-point between the first side edge 45C and the second side edge 47C, and the bottom surface 43C includes a second recessed area 109, proximate a mid-point between the first side edge 45C and the second side edge 47C.

In the illustrated embodiment, the first recessed area 107 is a first v-shaped notch, and the second recessed area 109 is a second v-shaped notch. The first v-shaped notch is formed by a first slant surface 111 intersecting with a second slant surface 113, wherein said first and second slant surfaces 111 and 113 meet at approximately a forty-five degree angle. The second v-shaped notch is formed by a third slant surface 115 intersecting with a fourth slant surface 117, wherein the third and fourth slant surfaces 115 and 117 meet at approximately a forty-five degree angle.

The first and second v-shaped notches provide natural bend points when the first and second slots 49C and 51C are opened by the first and second wedges 75 and 77. As such, the elongations and compressions of the material forming the body 39C are reduced, after the opening of the first and second slots 49C and 51C, as best seen in FIG. 10. The isolator 33C of FIGS. 9 and 10 may be used in conjunction with the machine 63 of FIG. 6 to form a twisted pair cable 65C.

Figure 11:
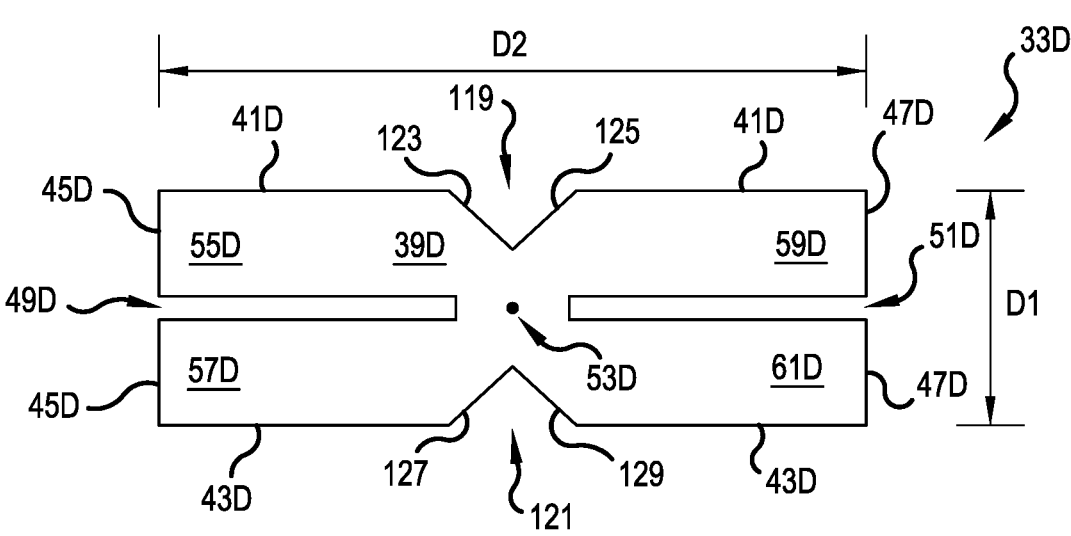
FIG. 11 is a cross sectional view of a fourth embodiment of an isolator similar to FIG. 3.

FIG. 11 is a cross sectional view of an isolator 33D, in accordance with a fourth embodiment. The isolator 33D includes a body 39D formed as an elongate strip with a top surface 41D and a bottom surface 43D. The first distance D1 exists between the top surface 41D and the bottom surface 43D, and defines a thickness of the body 39D. A first side edge 45D and a second side edge 47D are formed on the body 39D. The second distance D2 exists between the first side edge 45D and the second side edge 47D and defines a width of the body 39D.

A first slot 49D is formed in the first side edge 45D. The first slot 49D extends into the body 39D in a direction of the width of the body 39D. More particularly, the first slot 49D extends toward a center 53D of the isolator 33D, parallel to the top and bottom surfaces 41D and 43D. The first slot 49D extends into the body 39D at least halfway to the center 53D of the isolator 33D, e.g., more than 75% of the way, such as about 85% of the way to the center 53D, and extends along the entire length of the isolator 33D. The first slot 49D creates first and second legs 55D and 57D.

A second slot 51D is formed in the second side edge 47D. The second slot 51D extends into the body 39D in a direction of the width of the body 39D. More particularly, the second slot 51D extends toward the center 53D of the isolator 33D, parallel to the top and bottom surfaces 41D and 43D. The second slot 51D extends into the body 39D at least halfway to the center 53D of the isolator 33D, e.g., more than 75% of the way, such as about 85% of the way to the center 53D, and extends along the entire length of the isolator 33D. The second slot 51D creates third and fourth legs 59D and 61D.

The material used for the body 39D may be the same material used for the body 39. The primary difference between the embodiment of FIG. 11 and the embodiment of FIG. 4 is that top surface 41D includes a first recessed area 119, proximate a mid-point between the first side edge 45D and the second side edge 47D, and the bottom surface 43D includes a second recessed area 121, proximate a mid-point between the first side edge 45D and the second side edge 47D.

In the illustrated embodiment, the first recessed area 119 is a first v-shaped notch, and the second recessed area 121 is a second v-shaped notch. The first v-shaped notch is formed by a first slant surface 123 intersecting with a second slant surface 125, wherein said first and second slant surfaces 123 and 125 meet at approximately a ninety degree angle. The second v-shaped notch is formed by a third slant surface 127 intersecting with a fourth slant surface 129, wherein the third and fourth slant surfaces 127 and 129 meet at approximately a ninety degree angle.

Figure 12:
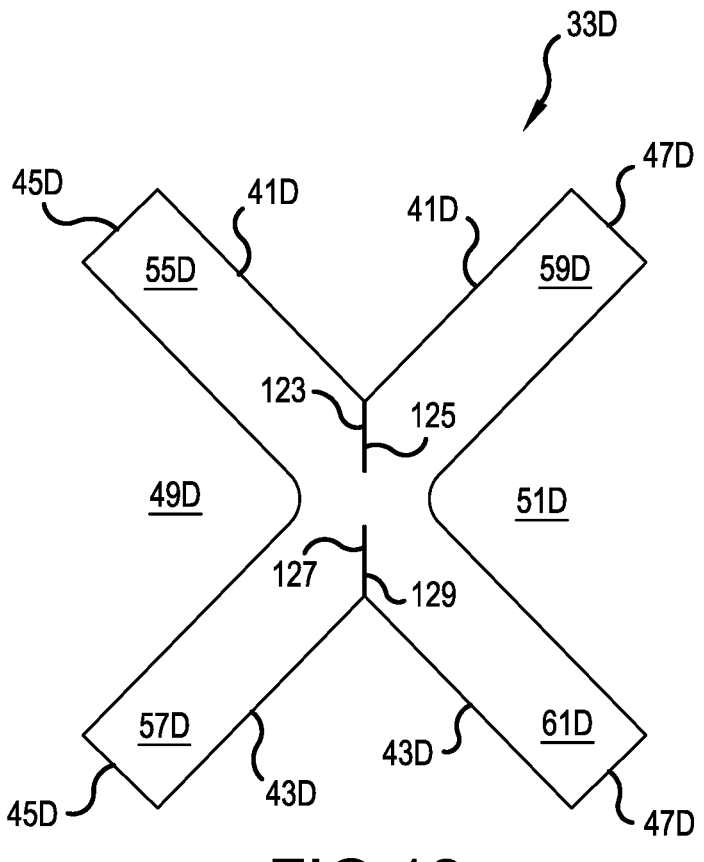
FIG. 12 is a cross sectional view of the isolator of FIG. 11 after passing through the cable assembly unit.

The first and second v-shaped notches provide natural bend points when the first and second slots 49D and 51D are opened by the first and second wedges 75 and 77. As such, the elongations and compressions of the material forming the body 39D are reduced, after the opening of the first and second slots 49D and 51D, as best seen in FIG. 12. As also seen in FIG. 12, the angle between the first and third legs 55D and 59D is approximately ninety degrees, and the angle between the second and fourth legs 57D and 61D is approximately ninety degrees. Likewise, the angle between the first and second legs 55D and 57D is approximately ninety degrees, and the angle between the third and fourth legs 59D and 61D is approximately ninety degrees. The isolator 33D of FIGS. 11 and 12 may be used in conjunction with the machine 63 of FIG. 6 to form a twisted pair cable 65D.

Figure 13:
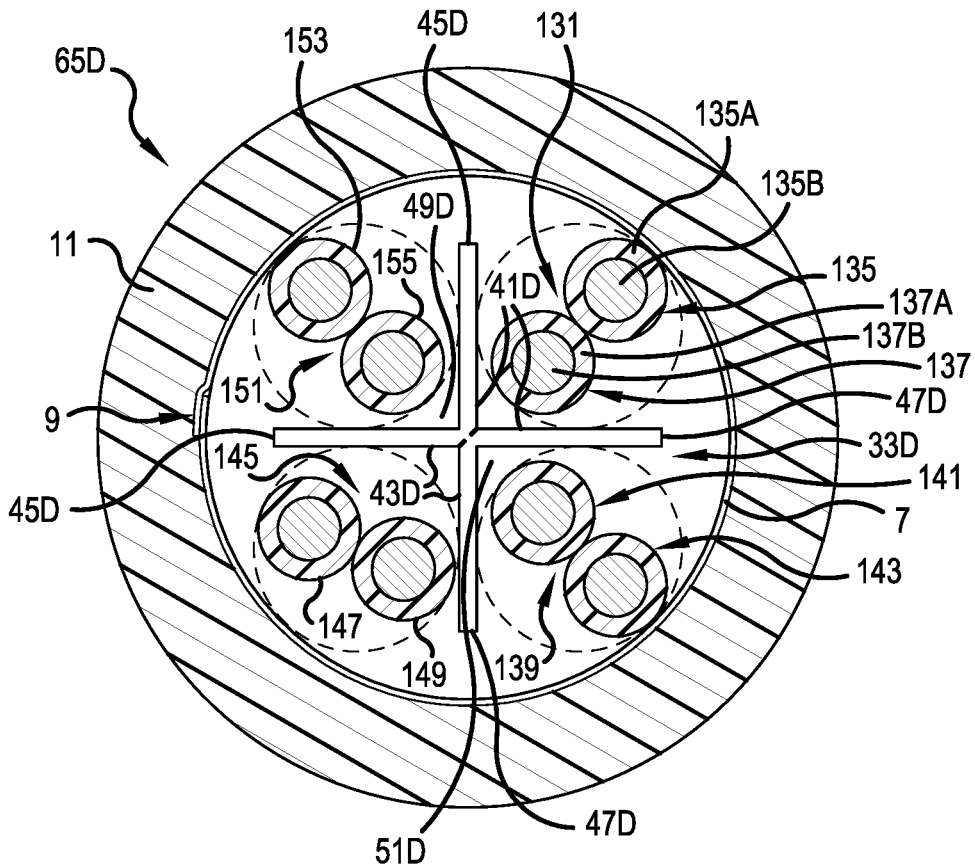
FIG. 13 is a cross sectional view of a twisted pair cable, having the isolator of FIGS. 11-12.

FIG. 13 is a cross sectional view of the twisted pair cable 65D. The twisted pair cable 65D includes a first twisted pair 131. The first twisted pair 131 includes a first insulated conductor 135 formed by a first insulating material 135A surrounding a first conductor 135B, and a second insulated conductor 137 formed by a second insulating material 137A surrounding a second conductor 137B. The first and second insulated conductors 135 and 137 are twisted about each other to form the first twisted pair 131.

A second twisted pair 139 includes a third insulated conductor 141 formed by a third insulating material surrounding a third conductor, and a fourth insulated conductor 143 formed by a fourth insulating material surrounding a fourth conductor, wherein said third and fourth insulated conductors 141 and 143 are twisted about each other to form the second twisted pair 139.

A third twisted pair 145 includes a fifth insulated conductor 147 formed by a fifth insulating material surrounding a fifth conductor, and a sixth insulated conductor 149 formed by a sixth insulating material surrounding a sixth conductor, wherein the fifth and sixth insulated conductors 147 and 149 are twisted about each other to form the third twisted pair 145.

A fourth twisted pair 151 includes a seventh insulated conductor 153 formed by a seventh insulating material surrounding a seventh conductor, and an eighth insulated conductor 155 formed by an eighth insulating material surrounding an eighth conductor, wherein the seventh and eighth insulated conductors 153 and 155 are twisted about each other to form the fourth twisted pair 151.

The twist lengths w, x, y and z of the first, second, third and fourth twisted pairs 131, 139, 145 and 151 may be the same as listed in Table 1 for twisted pairs A, B, C and D, respectively. For example, a first twist length w of the first twisted pair 131 may be shorter than a third twist length y of the third twisted pair 145, and a second twist length x of the second twisted pair 139 may be shorter than a fourth twist length z of the fourth twisted pair 151. It should be noted that other twist lengths than those listed in Table 1 may be employed while practicing the benefits of the present invention.

The first through eighth insulating materials may be formed of a flexible plastic material having flame retardant and smoke suppressing properties, such as a polymer or foamed polymer, common to the cabling art, like fluorinated ethylene propylene (FEP), polyethylene (PE) or polypropylene (PP). For plenum-rated cables, the first through eighth insulating materials of the prior art (FIGS. 1 and 2) are typically formed of FEP due to its superior properties relating to fire and smoke suppression. Unfortunately, FEP is an expensive material. Therefore, a preferred material composition for the first through eighth insulating materials of the present invention is a filled polyolefin. The fill materials may include one or more fire retardants, such as ammonium octamolybdate (AOM), or microencapsulated AOM, as detailed in the present Assignee's pending application serial number PCT/US2020/031490. Other suitable fire retardant materials could include calcium carbonate, clay, metal hydroxide, mica, red phosphorus, silica, talc and zinc borate (sold under the trademark FIRE BRAKE). In one embodiment, the fill material may also include glass beads, sometimes referred to as glass microspheres. Such glass beads are hollow and include air therein, which can reduce the dielectric constant of the polyolefin material, as well as reduce the amount of polyolefin material available to burn.

The first through eighth insulating materials, as well as, the materials used to form the isolator 33A, 33B, 33C, 33D and the dielectric outer jacket 11 may also be formed in accordance with the disclosure shown in the Assignee's U.S. patent application Ser. No. 17/156,571, filed Jan. 23, 2021 having the title HIGH STRENGTH DIELECTRIC MEMBER FOR A COMMUNICATIONS CABLE, which is herein incorporated by reference. In particular, since the isolator 33A, 33B 33C, 33D will be subjected to high-speed cable assembly equipment, it would be advantageous to fill the dielectric material with strength members, such as fire retardant particles and to then subject the isolator 33A, 33B, 33C, 33D to elongation in one or more directions to create vacuum voids within the isolator 33A, 33B, 33C, 33D. For example, the isolator 33A, 33B 33C, 33D could include one or more of fillers of aluminum tri-hydrate (ATH), talc, magnesium hydroxide and glass beads, which would improve the burn characteristics of the isolator 33A, 33B 33C, 33D, and in the case of hollow glass beads, the dielectric constant of the isolator 33A, 33B 33C, 33D.

Then, the isolator 33A, 33B 33C, 33D could be subjected to an elongation. Elongation of the isolator 33A, 33B 33C, 33D improves the strength of the isolator, so that it may be fed at high speeds into the cable assembly area 35. When, the strength members/fillers are present within the material of the isolator 33A, 33B 33C, 33D, vacuum voids are created during elongation. The vacuum voids improve both the burn characteristics and the lower the dielectric constant of the isolator 33A, 33B 33C, 33D. Additional details can be found in the Assignee's U.S. patent application Ser. No. 17/156, 571, filed Jan. 23, 2021.

A radial thickness of the first through eighth insulating materials would typically be greater than seven mils, such as about tens mils or about eleven mils. The first through eighth conductors may be solid or stranded, and may be formed of a conductive metal or alloy, such as copper. In one embodiment, the first through eighth conductors are each a solid, copper wire of about twenty three gauge size.

Similar to FIG. 1, the cable core of twisted pair cable 65D may be twisted in the direction of arrow 30 to form a core strand. In the illustrated embodiment, the direction 30 is opposite to the twist directions of the first, second, third and fourth twisted pairs 131, 139, 145 and 151 and may offer advantages as discussed in the Assignee's U.S. Pat. No. 6,770,819, which is incorporated herein by reference. However, this is not a necessary feature, as the benefits of the present invention will still be apparent with the core strand's direction 30 being the same as the pair twist directions.

The isolator 33D separates the first twisted pair 131 from said second, third and fourth twisted pairs 139, 145 and 151, separates said second twisted pair 139 from the third and fourth twisted pairs 145 and 151, and also separates the third twisted pair 145 from the fourth twisted pair 151. The isolator 33D has a closed first notch formed on the top surface 41D thereof, and the first twisted pair 131 abuts the top surface 41D. The isolator 33D also has a closed second notch on the bottom surface 43D thereof, and the third twisted pair 145 abuts the bottom surface 43D. The second twisted pair 139 resides in the open fourth slot 51D, and the fourth twisted pair 151 resides in the open first slot 49D.

The shielding layer 7 surrounds the isolator 33D and the first, second, third and fourth twisted pairs 131, 139, 145 and 151. The outer jacket 11 surrounds the shielding layer 7, the isolator 33D, and the first, second, third and fourth twisted pairs 131, 139, 145 and 151. In all of the embodiments, the shielding layer 7 is optional and/or may be removed especially if the cable is employed in an environment where alien crosstalk is not problematic, e.g., the cable is not adjacent to other cables or sources emitting or susceptible to EMF. The alien crosstalk performance in the above described twisted pair cables could be enhanced by employing a striated jacket, as shown in U.S. Pat. No. 5,796,046 and published U.S. Application 2005/0133246, both of which are herein incorporated by reference. The alien crosstalk performance could be further enhanced by employing twist modulation and/or core strand modulation, as shown in the Assignee's U.S. Pat. No. 6,875,928, which is incorporated herein by reference.

Figure 14:
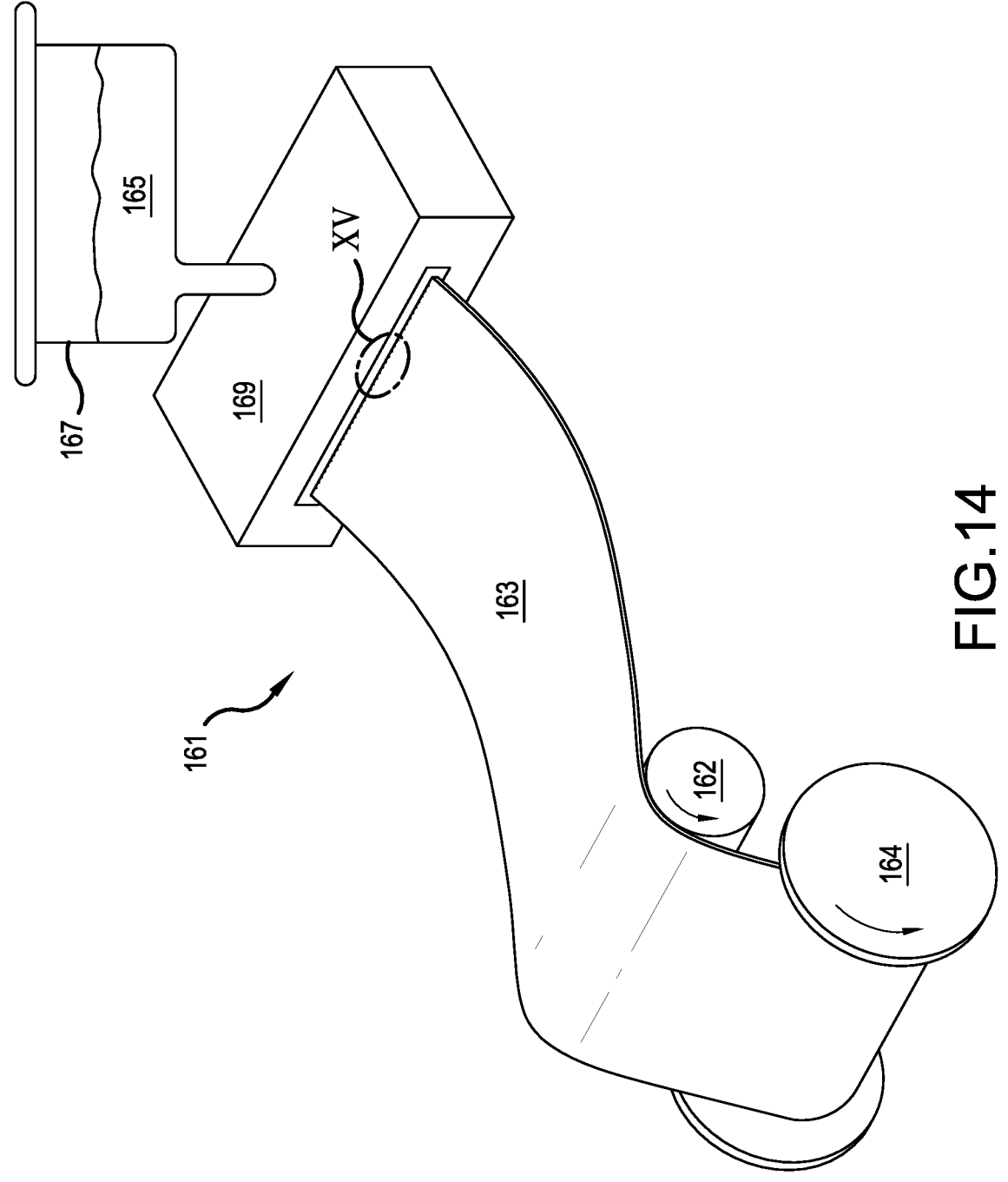
FIG. 14 is a block diagram of a machine to produce a sheet of isolators in accordance with FIGS. 11-12.

FIG. 14 is a block diagram of one potential embodiment of a machine 161 used to produce a sheet 163 of isolators 33D in accordance with FIGS. 11-12. The machine 161 is an extruder 169 and receives pellets 165 from a hopper 167. The pellets may be formed from polyethylene or fluorinated ethylene-propylene (FEP) or other such materials. In a preferred embodiment, the pellets are not formed of FEP, but rather are formed of a less expensive polyolefin material with embedded strength members, which are selected to also improve the burn characteristics of the polyolefin material. The extruder 169 would heat the pellets 165 into a slurry.

The slurry may be extruded with or without a foaming agent through an extrusion die 171. The sheet 163 of isolators 33D may pass over one or more powered or idler rollers 162, then the sheet 162 will be accumulated onto a reel 164. If desired, the one or more powered or idler rollers 162 may be speed controlled and/or spaced apart from each other so as to pull and/or compress the sheet 162 and cause an elongation of the sheet 163 to create vacuum voids within the sheet 162, as previously mentioned and explained in more detail in the Assignee's U.S. patent application Ser. No. 17/156,571, filed Jan. 23, 2021. In such a case, foaming agents may not be needed. Of course, the sheet 163 of isolators 33D would preferably pass through a cooling device, like the water bath 88 of FIG. 6 prior to being stored on the reel 164. The construction of the machine 161 is basically in accordance with the known machines for producing a sheet of separator "tapes," except for the construction of the extrusion die 171 and the aspects enabling elongation of the sheet 163.

Figure 15:
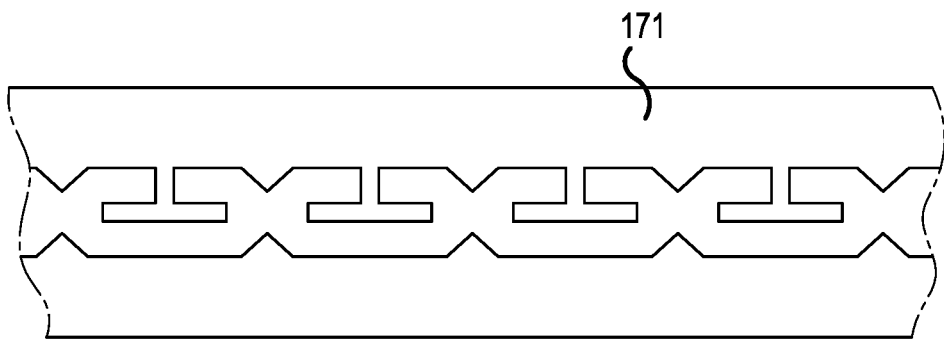
FIG. 15 is a close-up view of a circled portion XV in FIG. 14 showing the details of an extrusion die.

FIG. 15 is a close-up view of a circled portion XV in FIG. 14 showing the details of the extrusion die 171. The extrusion die has complimentary features to produce the features of the isolator 33D of FIGS. 11-12. For example, the extrusion die 171 has "reversed" or complementary projections to produce the first and second slots 49D and 51D, the first, second, third and forth legs 55D, 57D, 59D and 61D, and the first and second recessed areas 119 and 121. In practice, the sheet 163 of isolators 33D may include twenty to twenty-five isolators 33D in a side-by-side configuration.

Figure 16:
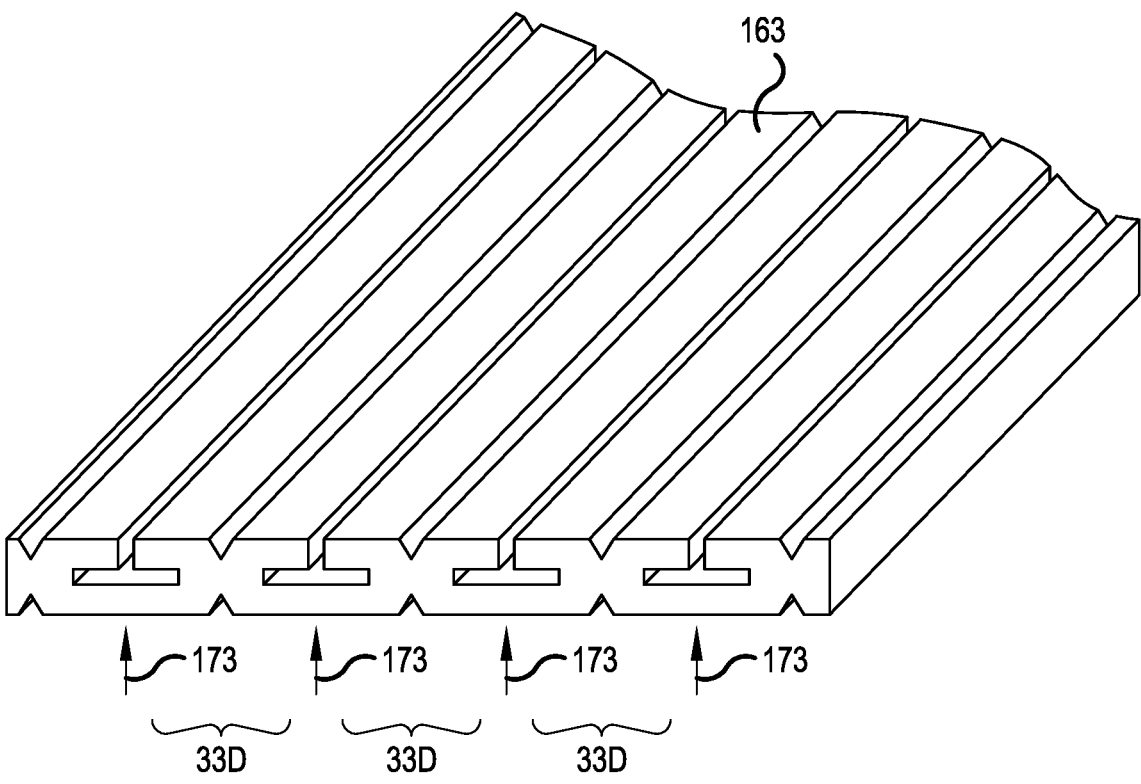
FIG. 16 is a perspective view of a portion of a sheet of isolators produced by the portion XV of the extrusion die illustrated in FIG. 15.

FIG. 16 is a perspective view of a portion of the sheet 163 of isolators 33D produced by the portion XV of the extrusion die 171. The represented portion of the sheet 163 of isolators 33D includes three isolators 33D, and portions of an isolator 33B on each of the left side and the right side. Arrows 173 indicate the points where the sheet 163 of isolators 33D is cut to form individual isolators 33D. The cutting is typically performed by a blade or laser, as the sheet is driven past the blade or laser, and the individual isolators 33D are accumulated onto separator reels 31, as shown in FIGS. 3 and 6, to be shipped to customers, e.g., cable manufacturers. As previously mentioned, the extrusion and the cutting processes may be performed in the same manner as previously performed for the manufacturing of separator tapes, except for the shape of the extrusion die 171. Also, it would be possible to replace the extrusion die 171 with a flat sheet extrusion die and to cut all of the features of the isolator 33D (the first and second slots 49D and 51D and the first and second recessed areas 119 and 121) into the isolators 33D using a blade or laser as the sheet 163 and/or the individual isolator 33D is being driven past the blade or laser. Further, it would be possible to extrude a first sheet including the top surface 41, 41B, 41C, 41D and a separate, second sheet including the bottom surface 43, 43B, 43C, 43D and then longitudinally fuse only a center section of the facing, first and second sheets together so as to form the first and second slots 49 and 51 between the unfused, facing portions of the first and second sheets.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

We claim:

1. A method of forming a twisted pair cable comprising:
 providing an isolator including:

a body formed as an elongate strip with a top surface and a bottom surface, with a distance between the top and bottom surfaces defining a thickness of the body;

a first side edge and a second side edge formed on the body, with a distance between the first and second side edges defining a width of the body; and a first slot formed in the first side edge and extending into the body in a direction of the width of the body;

feeding the isolator to a cable assembly area;

opening the first slot of the isolator in the cable assembly area;

placing a first twisted pair into the opened first slot of the isolator;

placing a second twisted pair adjacent to the top surface of the isolator;

placing a third twisted pair adjacent to the bottom surface of the isolator; and covering the isolator and the first, second and third twisted pairs with a jacket.

2. The method according to claim 1, wherein said covering the isolator and the first, second and third twisted pairs with the jacket includes extruding the jacket onto the isolator and the first, second and third twisted pairs.

3. The method according to claim 2, wherein the isolator includes a second slot formed in the second side edge and extending into the body in a direction of the width of the body, and wherein said method further comprises:

opening the second slot of the isolator in the cable assembly area; and placing a fourth twisted pair into the opened second slot of the isolator.

4. The method according to claim 1, further comprising:

imposing a core twist to the isolator and the first, second and third twisted pairs prior to said covering the isolator and the first, second and third twisted pairs with the jacket.

5. The method according to claim 1, further comprising:

surrounding the isolator and the first, second and third twisted pairs with a shielding layer prior to said covering the isolator and the first, second and third twisted pairs with the jacket.

6. The method according to claim 1, further comprising:

imposing a core twist to the isolator and the first, second and third twisted pairs; and surrounding the isolator and the first, second and third twisted pairs with a shielding layer prior to said covering the isolator and the first, second and third twisted pairs with the jacket.

7. A method of forming a twisted pair cable comprising:

providing an isolator including:

a body formed as an elongate strip with a top surface and a bottom surface, with a distance between the top and bottom surfaces defining a thickness of the body; and a first side edge and a second side edge formed on the body, with a distance between the first and second side edges defining a width of the body;

feeding the isolator to a cable assembly area;

cutting a first slot into the first side edge, which extends into the body in a direction of the width of the body;

opening the first slot of the isolator in the cable assembly area;

placing a first twisted pair into the opened first slot of the isolator;

placing a second twisted pair adjacent to the top surface of the isolator;

placing a third twisted pair adjacent to the bottom surface of the isolator; and covering the isolator and the first, second and third twisted pairs with a jacket.

8. The method according to claim 7, further comprising:

cutting a second slot into in the second side edge, which extends into the body in a direction of the width of the body;

opening the second slot of the isolator in the cable assembly area; and placing a fourth twisted pair into the opened second slot of the isolator.

9. The method according to claim 8, wherein said covering the isolator and the twisted pairs with the jacket includes extruding the jacket onto the isolator and the twisted pairs.

10. The method according to claim 8, further comprising:

feeding the first, second, third and fourth twisted pairs to the cable assembly area.

11. The method according to claim 8, further comprising:

imposing a core twist to the isolator and the first, second, third and fourth twisted pairs prior to said covering the isolator and the twisted pairs with the jacket.

12. The method according to claim 8, further comprising:

surrounding the isolator and the first, second, third and fourth twisted pairs with a shielding layer prior to said covering the isolator and the twisted pairs with the jacket.

13. The method according to claim 8, further comprising:

imposing a core twist to the isolator and the first, second, third and fourth twisted pairs; and surrounding the isolator and the first, second, third and fourth twisted pairs with a shielding layer prior to said covering the isolator and the twisted pairs with the jacket.

14. A method of forming a twisted pair cable comprising:

providing an isolator including:

a body formed as an elongate strip with a top surface and a bottom surface, with a distance between the top and bottom surfaces defining a thickness of the body;

a first side edge and a second side edge formed on the body, with a distance between the first and second side edges defining a width of the body;

a first slot formed in the first side edge and extending into the body in a direction of the width of the body; and a second slot formed in the second side edge and extending into the body in a direction of the width of the body;

feeding the isolator to a cable assembly area;

opening the first slot of the isolator in the cable assembly area;

opening the second slot of the isolator in the cable assembly area;

placing a first twisted pair into the opened first slot of the isolator;

placing a second twisted pair adjacent to the top surface of the isolator;

placing a third twisted pair into the opened second slot of the isolator;

placing a fourth twisted pair adjacent to the bottom surface of the isolator; and covering the isolator and the first, second, third and fourth twisted pairs with a jacket.

15. The method according to claim 14, further comprising:

feeding the first, second, third and fourth twisted pairs to the cable assembly area.

16. The method according to claim 14, wherein said covering the isolator and the first, second, third and fourth twisted pairs with the jacket includes extruding the jacket onto the isolator and the first, second, third and fourth twisted pairs.

17. The method according to claim 16, further comprising:

imposing a core twist to the isolator and the first, second, third and fourth twisted pairs prior to said extruding the jacket onto the isolator and the first, second, third and fourth twisted pairs.

18. The method according to claim 16, further comprising:

surrounding the isolator and the first, second, third and fourth twisted pairs with a shielding layer prior to said extruding the jacket onto the isolator and the first, second, third and fourth twisted pairs.

19. The method according to claim 16, further comprising:

surrounding the isolator and the first, second, third and fourth twisted pairs with a core wrap prior to said extruding the jacket onto the isolator and the first, second, third and fourth twisted pairs.

20. The method according to claim 16, further comprising:

imposing a core twist to the isolator and the first, second, third and fourth twisted pairs; and surrounding the isolator and the first, second, third and fourth twisted pairs with a shielding layer prior to said extruding the jacket onto the isolator and the first, second, third and fourth twisted pairs.

* * * * *